US009061667B2

(12) United States Patent
Schuller et al.

(10) Patent No.: US 9,061,667 B2
(45) Date of Patent: Jun. 23, 2015

(54) HYDRAULIC PISTON PUMP

(75) Inventors: Wolfgang Schuller, Cleebronn (DE); Juergen Reiner, Gestratz (DE)

(73) Assignee: Robert Bosch GmbH, Stuttgart (DE)

( * ) Notice: Subject to any disclaimer, the term of this patent is extended or adjusted under 35 U.S.C. 154(b) by 1181 days.

(21) Appl. No.: 12/682,410

(22) PCT Filed: Sep. 19, 2008

(86) PCT No.: PCT/EP2008/062506
§ 371 (c)(1),
(2), (4) Date: Apr. 9, 2010

(87) PCT Pub. No.: WO2009/049987
PCT Pub. Date: Apr. 23, 2009

(65) Prior Publication Data
US 2011/0089753 A1 Apr. 21, 2011

(30) Foreign Application Priority Data
Oct. 12, 2007 (DE) .......................... 10 2007 049 152

(51) Int. Cl.
*B60T 13/18* (2006.01)
*B60T 8/40* (2006.01)
*F04B 53/16* (2006.01)

(52) U.S. Cl.
CPC ............... *B60T 8/4031* (2013.01); *B60T 13/18* (2013.01); *F04B 53/168* (2013.01)

(58) Field of Classification Search
USPC .................................................. 303/11, 116.4
See application file for complete search history.

(56) References Cited

U.S. PATENT DOCUMENTS

| 4,363,607 A * | 12/1982 | Eichele et al. ................. 417/273 |
| 6,283,733 B1 * | 9/2001 | Merklein et al. .............. 417/549 |
| 6,334,762 B1 * | 1/2002 | Hauser et al. ................. 417/569 |
| 6,520,756 B1 * | 2/2003 | Alaze ............................ 417/441 |
| 6,866,489 B2 * | 3/2005 | Hinz et al. ..................... 417/470 |
| 2003/0053920 A1 | 3/2003 | Hinz et al. |
| 2004/0166004 A1* | 8/2004 | Schmitt et al. ................. 417/470 |
| 2004/0234400 A1* | 11/2004 | Schepp et al. ................. 417/471 |

FOREIGN PATENT DOCUMENTS

| DE | 19928913 A1 | 1/2001 |
| JP | 2001-501279 A | 1/2001 |
| JP | 2003-503630 A | 1/2003 |
| WO | 9906705 A1 | 2/1999 |
| WO | 9906707 A1 | 2/1999 |
| WO | 0170550 A2 | 9/2001 |

* cited by examiner

*Primary Examiner* — Robert A Siconolfi
*Assistant Examiner* — James Hsiao
(74) *Attorney, Agent, or Firm* — Maginot, Moore & Beck LLP

(57) ABSTRACT

The invention relates to a hydraulic piston pump, particularly for a slip-controllable vehicle braking system. A piston pump according to the invention includes a hydraulically permanently permeable stopper, the throughflow of which is carried out as a function of the pressure in an outflow channel of the piston pump. A pressure medium flow only takes place if the pressure level in the outflow channel has exceeded a threshold value. The latter takes place, for example, if the kinematic viscosity of the flowing pressure medium decreases due to low ambient temperatures, or if a throughflow of the outflow channel is obstructed. By means of the proposed solution, excess pressure increases in the interior of the piston pump can be avoided, and the resulting loads for the pressurized pump components and the drive can be reduced. Otherwise, the operating behavior of the piston pump according to the invention corresponds to that of a known piston pump.

19 Claims, 3 Drawing Sheets

HYDRAULIC PISTON PUMP

CROSS-REFERENCE TO RELATED APPLICATION

This application is a 35 USC 371 application of PCT/EP2008/052506 filed on Sep. 19, 2008.

BACKGROUND OF THE INVENTION

1. Field of the Invention

The invention is based on a hydraulic piston pump, in particular for a vehicle brake system with electronic traction control.

2. Description of the Prior Art

Brake systems with electronic traction control are also known as ABS/TC/ESP brake systems. These brake systems, for regulating the brake pressure at the individual wheel brakes as a function of any wheel slip that might occur, have a hydraulic unit that is triggerable by an electronic control unit. This hydraulic unit includes a metal housing block, with hydraulic components secured to the block. The piston pumps on which the invention is based form a substantial part of these hydraulic components. They are needed for supplying pressure fluid inside the hydraulic system of a vehicle brake system.

From German Patent Disclosure DE 199 28 913 A1, a piston pump is already known. This known piston pump comprises a piston, a piston bush embodied as a cylinder, inlet and outlet valves, and sealing elements. The valves control the flow direction of pressure fluid through the piston pump. The inlet valve serves to cause the pressure fluid not to flow back to the intake side during a working stroke of the compression, while the outlet valve prevents a return flow of the pumped pressure fluid into the pump interior. Typically, the valves are embodied as spring-loaded ball valves. An outflow conduit of the piston pump is embodied between a closure stopper and the bottom of the piston bush.

The closure stopper closes a bore, which receives the piston pump, off from the environment. It is produced by either metal-cutting or non-metal-cutting shaping techniques; from an economic standpoint, non-metal-cutting shaping is attractive for high-quantity production.

The noise behavior can be varied by way of the geometry of the outflow conduit of the piston, pump. Typically, the outflow conduit therefore has a suitable taper, in order to establish a throttling action. By means of this throttling action, a hydraulic low-pass filter is created, which has a favorable effect on the noise. The behavior of the kinematic viscosity of the brake fluid in the range between 0° C. and 120° C. can be considered virtually constant, and the optimal throttling action is defined for that temperature range.

However, the kinematic viscosity of the pressure fluid changes sharply in the low-temperature range (−40° C. to 0° C.), which leads to a pressure increase in the interior of the piston pump and thus to an increased load on the pressure-impinged components of the piston pumps and on the entire drive of the piston pump. Dirt particles in the pressure fluid can also prevent an outflow of pressure fluid and cause a pressure increase.

ADVANTAGES AND SUMMARY OF THE INVENTION

A piston pump as defined by the invention has the advantage over the prior art that excessive pressure increases in the pump interior, with the attendant loads on the pressure-impinged components, are reduced. The mechanism proposed for this develops an action only as needed, or in other words when the pressure level in the interior of the piston pump has exceeded a threshold value. Below that threshold value, the proposed means are inactive, since because of their greater flow resistance, pressure fluid does not flow through them. The proposed mechanism requires no additional components, since it can be provided solely by means of a structural design of the components that are already present. This geometric design of the mechanism is variable on a use-specific basis and can advantageously not be defined until in the course of installation of the components.

Because of the mechanism provided according to the invention, the drive power required for driving the piston pumps is reduced. This in turn makes it possible to optimize the construction of these components.

It is also advantageous that the mechanism of the invention do not affect the flow conditions, particularly at the closing member of the outlet valve, of a known piston pump. This means that the closing member of a piston pump according to the invention opens in an unchanged manner in a preferred direction, and that a piston pump of the invention has unchanged good noise properties.

Further advantages or advantageous refinements of the invention will become apparent from the dependent claims or the ensuing description.

BRIEF DESCRIPTION OF THE DRAWINGS

Exemplary embodiments of the invention are shown in the drawings and described in further detail in the ensuing description in conjunction with the accompanying drawings, in which.

Components corresponding to one another in the various exemplary embodiments are identified by the same reference numerals in the various drawings.

DESCRIPTION OF THE PREFERRED EMBODIMENTS

Figure 1:
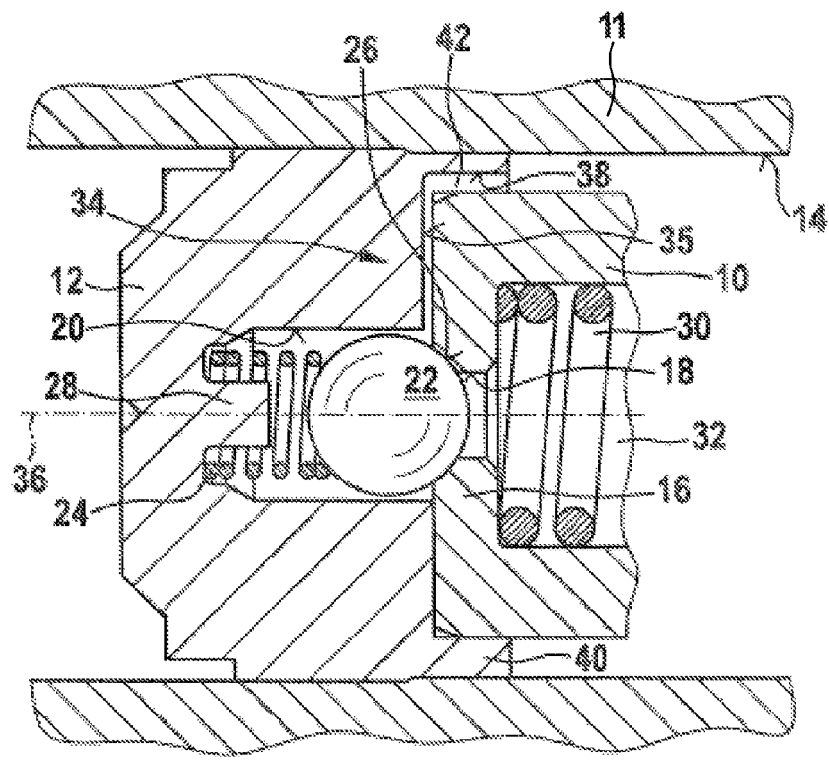
FIG. 1, in a longitudinal section, shows the outlet of a known piston pump.

FIG. 1 shows the outlet region of a piston pump known from the prior art (see for instance DE 199 28 913 A1). The portion of a bush 10 can be seen as well as a closure stopper 12 on one face end of which the bush 10 rests. The closure stopper 12 and the bush 10 are inserted in a bore 14, shown in suggested fashion, of a pump housing 11, and the closure stopper seals off this bore from the environment.

The bush 10 is embodied hollow-cylindrically and has a bush bottom 16 on its end toward the closure stopper 12. A through bore 18 is disposed centrally in the bush bottom 16. The through bore discharges into a valve chamber 20, which is embodied in the closure stopper 10. A valve closing body 22 in the form of a ball is received movably in this valve chamber 20. The valve closing body 22 is pressed by a valve spring 24 against a valve seat 26 on the face end of the bush 10. The valve spring 24 is braced for that purpose, by its end remote from the valve closing body 22, on the bottom of the valve chamber 20. For centering the valve spring 24, a projecting peglike protrusion 28 is integrally formed onto the bottom of the valve chamber 20. An additional function of this protrusion 28 is to limit an opening stroke of the valve closing body 22.

In the interior of the bush 10, a piston, not visible in FIG. 1, is axially movably guided in the known way. This piston is driven to a reciprocating stroke motion counter to the force of a piston restoring spring 30, also disposed in the interior of the bush 10 and braced on the bush bottom 16. In the process, the volume of a work chamber 32, defined between the piston and the valve closing body 22, varies.

In this work chamber 32, during the working stroke of the piston, the pressure rises until a pressure force caused by this pressure, which acts in an opening manner on the valve closing body 22, is greater than the oppositely oriented force, acting in the closing direction, of the valve spring 24. As soon as that is the case, the valve closing body 22 lifts from the valve seat 26, and pressure fluid flows out of the work chamber 32 into an outflow conduit 34.

The outflow conduit 34 is formed by a groove 35, which in the exemplary embodiment is embodied as an example on the face end toward the bush of the closure stopper 12. This groove 35 extends transversely to a longitudinal axis 36 of the closure stopper 12 and has its beginning in the valve chamber 20. The face end of the closure stopper 12 is embodied by a flat countersunk region 38. Because of this flat countersunk region 38, the closure stopper 12 has an encompassing collar 40, which surrounds the end of the bush 10 circumferentially. On the inside of this collar 40, there is a recess 42, oriented parallel to the longitudinal axis 36 of the bush 10. This recess opens into the groove 35 and together with this groove 35 forms the outflow conduit 34. The outflow conduit 34 is deflected once at a right angle at the transition from the groove 35 to the recess 42.

The face end of the closure stopper 12 is provided with only a single groove 35. The cross section of the groove is smaller than the cross section of the through bore 18 of the bush bottom 16. These proportions result in a throttling action in the outflowing pressure fluid and thus an intended pressure rise in the valve chamber 20. The pressure rise determines the flow conditions at the valve closing body 22, in such a way that on lifting from its valve seat 26, the valve closing body 22 executes a deflection motion oriented counter to the direction of the groove 35. This deflection motion, because of the radial orientation of the groove 35, always takes place in the same direction in space and thus defines a preferential position for the valve closing body 22 in the open state. Because of this preferential position, the pressure conditions of a piston pump can be better mastered. Moreover, a defined preferential position of the valve closing body 22 has a favorable effect on the noise behavior of the piston pump.

Figure 2:
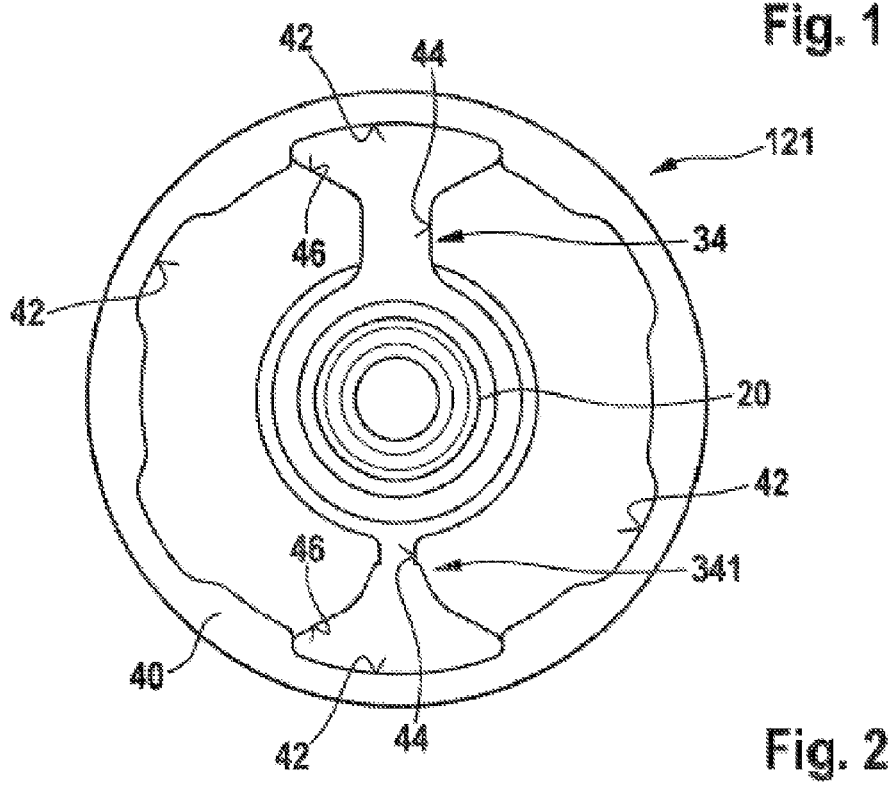
FIG. 2 shows a closure stopper of a piston pump of the invention in a top view.

FIG. 2 shows a closure stopper 121, embodied according to the invention, in a top view. Unlike the closure stopper 12 of FIG. 1, this closure stopper 121 has a first outflow conduit 34 and an additional, second outflow conduit 341. The outflow conduits 34 and 341 extend to both sides of the valve chamber 20 and are opposite one another in aligned fashion. The two outflow conduits 34, 341 have flow cross sections of different sizes; the first outflow conduit 34, which points upward in FIG. 2, has a cross section that is multiple times greater than the cross section of the second outflow conduit 341 that in FIG. 2 points downward. Because of the law of least resistance, the second outflow conduit 341 having the smaller cross section does not have a flow through it until the pressure level in the first outflow conduit 34 has risen and exceeded a threshold value. This threshold value can be determined structurally by the ratio of the cross-sectional areas and by the choice of the cross-sectional shape of the outflow conduits 34, 341. Below the threshold value, the pressure fluid flows virtually solely to the first outflow conduit 34. Thus the second outflow conduit 341 forms a means for limiting the pressure, since it is permanently hydraulically passable, and the flow through it takes place as a function of the prevailing pressure level in the outflow conduit 34.

A rise in this pressure level occurs for instance when because of falling ambient temperatures the viscosity of the pressure fluid and thus the flow resistance increase. A pressure increase would also be conceivable if dirt particles in the interior of the piston pump prevent a flow through the first outflow conduit 34. With a flow through both outflow conduits 34, 341, the pressure level in the interior of the piston pump, and thus the hydraulic load on the components subjected to pressure, are limited. Another reason why the two outflow conduits 34, 341 have different cross sections is so that the valve closing body 22 (FIG. 1) will without change assume a preferential position, regardless of the pressure conditions upon lifting from the valve seat 26 (FIG. 1), as has already been explained in conjunction with the description of FIG. 1.

The two outflow conduits 34, 341 are each embodied such that beginning at the valve chamber 20, there is first a first throttling portion 44 with parallel groove flanks. This throttling portion 44 is adjoined radially outward by a respective second groove portion 46 that widens the cross section of the outflow conduits 34, 341. The second groove portions 46 merge with recesses 42 on the inside of the encompassing collar 40 of the closure stopper 121. This collar 40 may have a plurality of such recesses 42 distributed over, its circumference, in order to simplify the orientation of the bush 10 relative to the closure stopper 12 upon assembly of the piston pump. The protruding portions of the collar 40 that are located between the recesses 42 bring about centering of the two components relative to one another.

Figure 3:
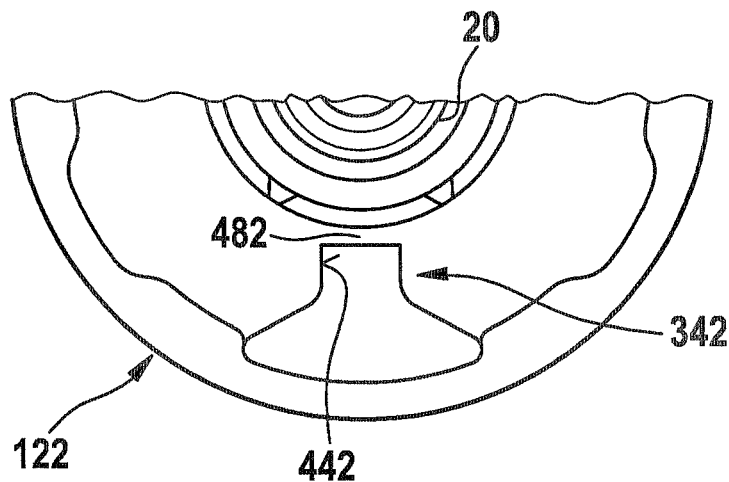
FIG. 3 shows a second exemplary embodiment of the invention.

FIG. 3 shows a second exemplary embodiment of a second outflow conduit 342 of a closure stopper 122 of a piston pump. In this special embodiment, the flow cross section of the second outflow conduit 342 is blocked off by a crossing rib 482. Before the assembly of the piston pump, this rib 482 can be shaped without metal cutting or removed with a suitable tool; such as a punch or a grinding tool. By way of a recess created in this way, the flow cross section of the second outflow conduit 342 can be adapted in shape and dimensions even during the production of the piston pump to the later conditions of use of a piston pump, and the pump characteristics can thus be determined.

Figure 4:
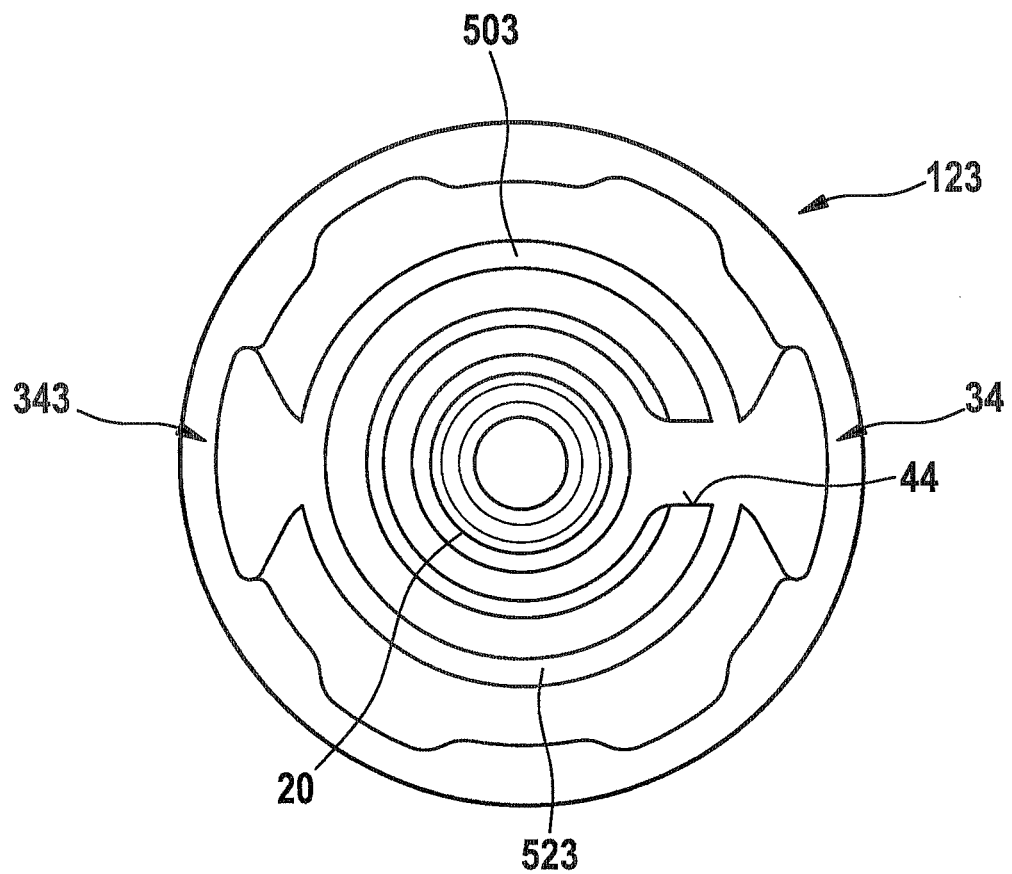
FIG. 4 shows a third exemplary embodiment.

FIG. 4, in a third exemplary embodiment, shows a further possibility of an embodiment of the outflow conduit 343 on a closure stopper 123. In this exemplary embodiment, the second outflow conduit 343, in a distinction from the examples of FIGS. 2 and 3, is not connected to the valve chamber 20 via its own throttling portion; instead, it is connected to the throttling portion 44 of the first outflow conduit 34 via semicircular first and second curved portions 503 and 523. The two curved portions 503 and 523 extend with radial spacing around the valve chamber 20 and together form a closed ring. The curved portions 503, 523, for determining the pump characteristics, may have the same conduit cross section or may be embodied with different cross sections. The provision of only a single curved portion may even suffice under some circumstances. The curved portions 503 and 523 are especially simple to produce by non-metal-cutting shaping technology.

Figure 5:
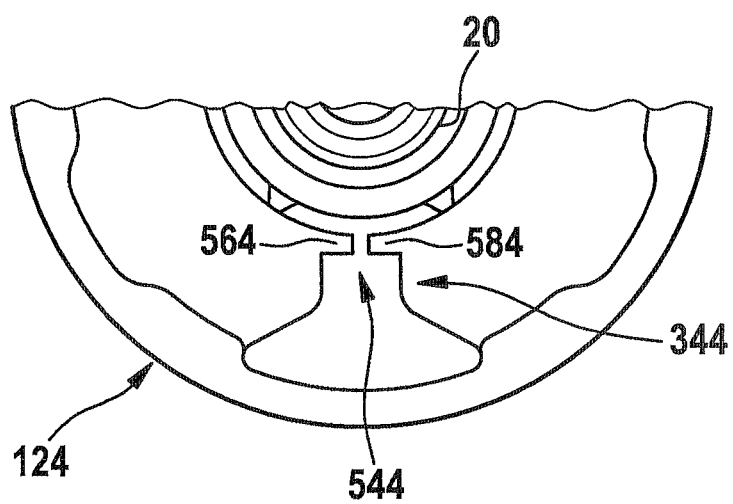
FIG. 5 shows a fourth exemplary embodiment, in each case in a top view on the face end, toward a bush of the piston pump, of a closure stopper.

In the exemplary embodiment of FIG. 5, a bursting throttle restriction 544 is provided in the second outflow conduit 344, between the valve chamber 20 and the recess 42 in the collar 40 (see FIG. 1 also) of the closure stopper 124. This bursting throttle restriction 544 is formed by two vanes 564 and 584, which are integrally formed in one piece onto the bottom of the flat countersunk region 38 of this closure stopper 124. The ends of the two vanes 564, 584 are opposite one another and by way of their spacing determine the flow cross section of the second outflow conduit 344. The vanes 564, 584 of the bursting throttle restriction 544 are embodied with comparatively thin walls and are plastically deformable as soon as the pressure level in the outflow conduit 344 exceeds a threshold value. Upon a deformation of the vanes 564, 584, the flow cross section of the second outflow conduit 344 increases. In this way, the bursting throttle restriction 544 of FIG. 5 is capable of preventing dirt particles, blocking the flow cross section, from causing a pressure rise in the interior of the piston pump in which the components subjected to pressure might suffer damage.

It is understood that modifications or additions to the exemplary embodiments described are possible without departing from the fundamental concept of the invention. In this respect, it should be noted that a subject according to the invention may also have more than one second outflow conduit. Moreover, the invention is not limited to an even number of outflow conduits. The outflow conduits may, as described, be embodied entirely on the face end of the closure stopper located in the interior of the piston pump, or partly or solely on the face end of the bush bottom oriented toward the closure stopper.

The invention claimed is:

1. A hydraulic piston pump for a brake system with electronic traction control, comprising:
a pump housing in which a piston is guided movably;
an inflow conduit that supplies pressure fluid and is embodied in the pump housing;
a first outflow conduit through which pressure fluid is discharged from an interior chamber of the piston pump to an outflow recess, the first outflow conduit having a throttle restriction that impedes flow of the pressure fluid; and
at least one second outflow conduit hydraulically connecting the interior chamber of the piston pump to the outflow recess,
wherein the at least one second outflow conduit is permanently hydraulically passable from the interior chamber of the piston pump to the outflow recess independently of the throttle restriction of the first outflow conduit, and
wherein flow through the at least one second outflow conduit is effected as a function of pressure in the first outflow conduit.

2. The hydraulic piston pump as defined by claim 1, wherein the at least one second outflow conduit has a second flow cross section that is smaller than a first flow cross section of the first outflow conduit.

3. The hydraulic piston pump as defined by claim 1, wherein the first outflow conduit and the at least one second outflow conduit are coupled hydraulically with one another.

4. The hydraulic piston pump as defined by claim 2, wherein the first outflow conduit and the at least one second outflow conduit are coupled hydraulically with one another.

5. The hydraulic piston pump as defined by claim 2, wherein the at least one second outflow conduit is hydraulically coupled with the first outflow conduit in the vicinity of the throttle restriction of the first outflow conduit.

6. The hydraulic piston pump as defined by claim 3, wherein the at least one second outflow conduit is hydraulically coupled with the first outflow conduit in the vicinity of the throttle restriction of the first outflow conduit.

7. The hydraulic piston pump as defined by claim 4, wherein the at least one second outflow conduit is hydraulically coupled with the first outflow conduit in the vicinity of the throttle restriction of the first outflow conduit.

8. The hydraulic piston pump as defined by claim 2, wherein the second flow cross section of the at least one second outflow conduit is defined by a bursting throttle restriction having at least one vane that is deformable as a function of pressure.

9. The hydraulic piston pump as defined by claim 7, wherein the second flow cross section of the at least one second outflow conduit is defined by a bursting throttle restriction having at least one vane that is deformable as a function of pressure.

10. The hydraulic piston pump as defined by claim 2, wherein the at least one second outflow conduit has a crossing rib.

11. The hydraulic piston pump as defined by claim 7, wherein the at least one second outflow conduit has a crossing rib.

12. A hydraulic piston pump, having a closure stopper that closes off a bore of the pump housing in pressure fluid-proof fashion from the surroundings, the pump housing being intended for receiving the piston pump, as defined by claim 2, wherein the at least one second outflow conduit is embodied at least partly on a face end, oriented toward the piston pump, of the closure stopper.

13. A hydraulic piston pump, having a closure stopper that closes off a bore of the pump housing in pressure fluid-proof fashion from the surroundings, the pump housing being intended for receiving the piston pump, as defined by claim 3, wherein the at least one second outflow conduit is embodied at least partly on a face end, oriented toward the piston pump, of the closure stopper.

14. A hydraulic piston pump, having a closure stopper that closes off a bore of the pump housing in pressure fluid-proof fashion from the surroundings, the pump housing being intended for receiving the piston pump, as defined by claim 5, wherein the at least one second outflow conduit is embodied at least partly on a face end, oriented toward the piston pump, of the closure stopper.

15. A hydraulic piston pump, having a closure stopper that closes off a bore of the pump housing in pressure fluid-proof fashion from the surroundings, the pump housing being intended for receiving the piston pump, as defined by claim 8, wherein the at least one second outflow conduit is embodied at least partly on a face end, oriented toward the piston pump, of the closure stopper.

16. A hydraulic piston pump, having a closure stopper that closes off a bore of the pump housing in pressure fluid-proof fashion from the surroundings, the pump housing being intended for receiving the piston pump, as defined by claim 10, wherein the at least one second outflow conduit is embodied at least partly on a face end, oriented toward the piston pump, of the closure stopper.

17. The hydraulic piston pump as defined by claim 12, wherein the closure stopper has a cylindrical cross section, and the first outflow conduit and the at least one second outflow conduit each extend radially to a longitudinal axis of this closure stopper.

18. The hydraulic piston pump as defined by claim 1, wherein a first flow cross section of the first outflow conduit is at least double a second flow cross section of the means for limiting pressure at least one second outflow conduit.

19. The hydraulic piston pump as defined by claim 2, wherein the second outflow conduit includes a second throttle restriction.

\* \* \* \* \*